United States Patent [19]

Friedes et al.

[11] Patent Number: 5,329,581
[45] Date of Patent: Jul. 12, 1994

[54] TARGET AREA CALLING SYSTEM

[75] Inventors: Albert Friedes, East Brunswick; Barbara I. Gaechter, Tinton Falls; Paramdeep S. Sahni, Marlboro; Susan M. Zoccolillo, Howell, all of N.J.

[73] Assignee: AT&T Bell Laboratories, Murray Hill, N.J.

[21] Appl. No.: 812,302

[22] Filed: Dec. 23, 1991

[51] Int. Cl.⁵ ............ H04M 11/00; H04M 3/42
[52] U.S. Cl. ..................... 379/92; 379/201; 379/207; 379/309
[58] Field of Search ........... 379/92, 216, 207, 201, 379/209, 265, 266, 93, 309, 142, 247

[56] References Cited

U.S. PATENT DOCUMENTS

| | | | |
|---|---|---|---|
| 3,570,008 | 3/1971 | Downing et al. | 340/172.5 |
| 4,599,493 | 7/1986 | Cave | 379/247 |
| 4,899,373 | 2/1990 | Lee et al. | 379/207 |
| 5,181,236 | 1/1993 | La Vallee et al. | 379/142 |
| 5,187,740 | 2/1993 | Swaim et al. | 379/209 |

OTHER PUBLICATIONS

AT&T Technical Journal, V.64, No. 6,Part 2, Jul. 1985, "The 5ESS Switching System", (Index only is attached due to voluminous nature of publication–complete text will be furnished if requested).
AT&T Technical Journal, V. 65, Issue 1, Jan. 1986; (Index only is attached due to voluminous nature of publication—complete text will be furnished if requested).
AT&T Technical Journal, V.65, Issue 5, Sep. 1986, "Conversant 1 Voice System", R. J. Perdue, pp. 34–47.
The Bell System Technical Journal,V.43, No. 5, No. 1 ESS Parts 1 & 2, Sep. 1964, (Cover sheet and Index only are attached due to voluminous nature of publication—complete text will be furnished if requested.
The Bell System Technical Journal,V.56, No. 7, Sep. 1977, No. 4ESS, (Cover Sheet and Index only are attached due to voluminous nature of publication—complete text will be furnished if requested.
Engineering & Operations in the Bell System, 2nd Edition, 1982, Sec.8.5.5, pp. 292–294.

Primary Examiner—Curtis Kuntz
Assistant Examiner—Jason Chan
Attorney, Agent, or Firm—Barry H. Freedman

[57] ABSTRACT

A system for completing a series of calls from a calling party to a plurality of called parties served by a common terminating switch and located in the same general geographic area, is implemented by a) establishing a first communication path from the calling party to the terminating switch b) establishing a second communication path from the terminating switch to the the called party using routing information received from the calling party regarding the called party c) bridging those two communication paths to form a complete connection from the calling party to the called party d) preserving the first communication path and reusing it to complete all the calls in the series.

18 Claims, 7 Drawing Sheets

FIG. 2
ORIGINATING POINT SWITCHING COMPLEX ALTERNATIVES
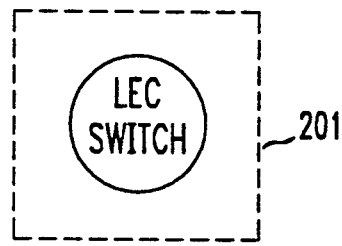
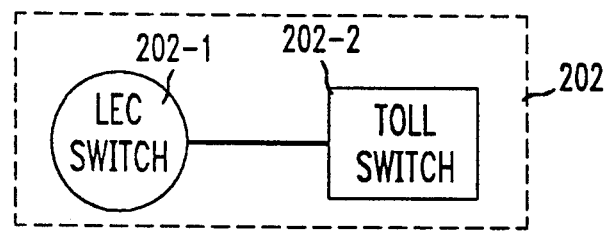
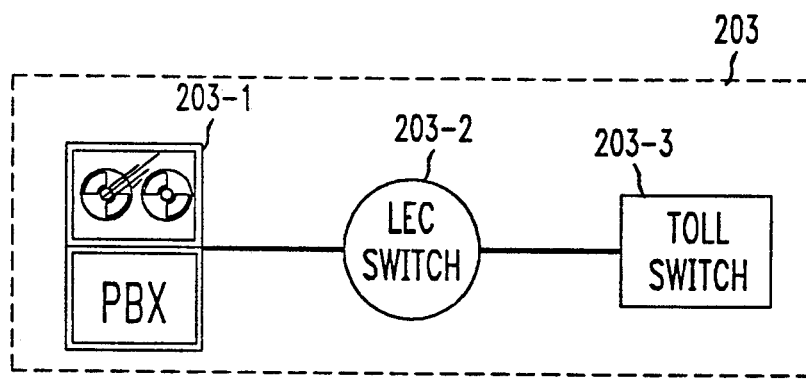
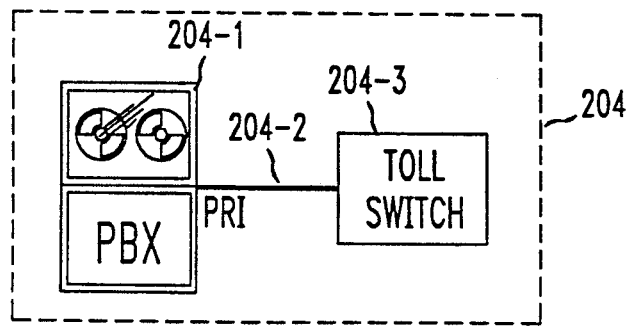

FIG. 3
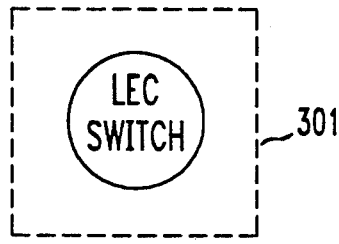
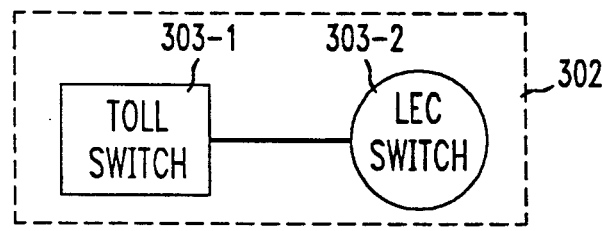
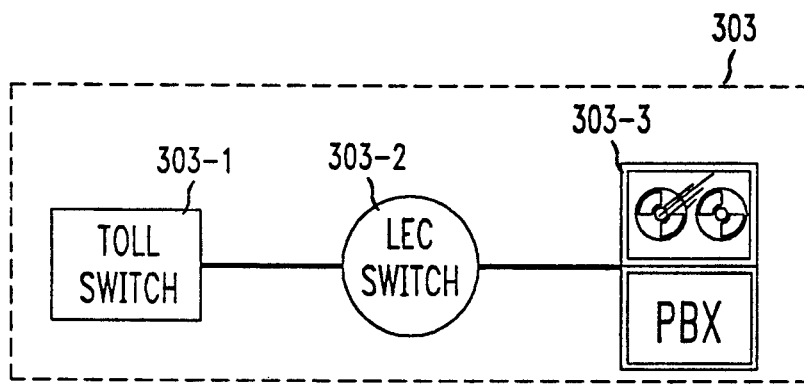
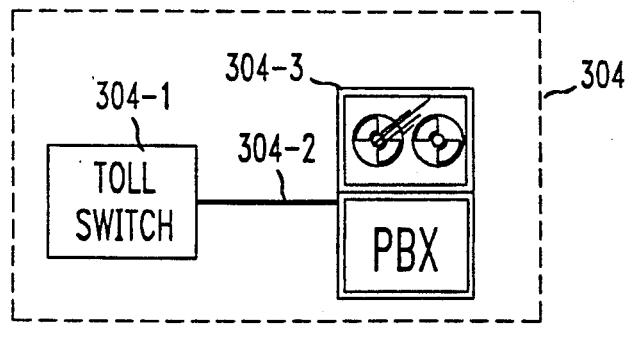

TARGET AREA CALLING SYSTEM

TECHNICAL FIELD

This invention relates generally to telecommunications systems and, in particular, to a method and apparatus for completing a series of calls from a calling party to a plurality of called parties located in the same general geographic area.

BACKGROUND OF THE INVENTION

As is well known, telecommunication systems route and complete telephone calls by a) receiving called party information-typically a seven-digit or ten-digit telephone number provided by a calling party b) using that information to establish a telecommunications connection, and c) at the termination of the call, "tearing down" the connection, thereby releasing the telecommunications resources that were used in the connection to allow appropriation of these resources to establish connections for subsequent calls between other calling and called parties.

SUMMARY OF THE INVENTION

We have realized that this standard prior art approach to use telecommunications resources for making telephone connections is inefficient in the case of so-called "target area" calling, in which a telemarketing firm, for example, places a long series of calls to the same geographic or "target" area. In accordance with the invention, at least a portion of an initial telecommunication connection from the caller to a called party in the target area is preserved and reused for subsequent calls to other called parties in the target area. Advantageously, the invention affords the caller shorter call set-up time because it minimizes the number of switching occurrences needed to complete a call. Other important advantages of the invention include substantial reduction in the usage of the carrier's signaling network and abbreviated dialing.

In exemplary embodiments of our invention, the connections are made using the facilities of a Local Exchange Carrier and/or an Interexchange Carrier (IXC) such as AT&T. When the facilities of an Interexchange Carrier are used, the aforementioned reused portion may include a long distance communication path from a calling party to the IXC's terminating switching point.

In a first such embodiment, target area calls are made via an adjunct processor which is attached to, and works in cooperation with, the carrier's terminating switching point. Upon the termination of an initial call requesting target area service, and each call in the series thereafter, the adjunct processor preserves the connection between itself and the calling party and prompts the caller for the telephone number of the next call to be made, and thereupon initiates the establishing of that call.

In a second such embodiment, several communication channels between a carrier's originating and terminating switching points are reserved. Voice switching premises equipment, such as a Private Branch Exchange (PBX) or an Automatic Call Distributor (ACD) serving a plurality of station sets, is connected to the originating switching point. In addition, the PBX (ACD) stores all needed information to initiate a sequence of calls to a particular area. Once communication channels between the PBX (ACD) and the terminating switching point are activated, the PBX (ACD) sends the stored telephone number of a first called party to the carrier's terminating switch point to complete the call. When the called party answers, the PBX (ACD) establishes a connection between the called party and one of its station sets. The same pattern is repeated for other calls in the series which are connected to the remaining stations sets until all the reserved communication channels are in use. When channels become available, the PBX (ACD) continues the same process until all the stored called party telephone numbers have been dialed.

BRIEF DESCRIPTION OF THE DRAWING

In the drawing:

FIG. 2 and FIG. 3 represent different alternatives for originating point switching complex and terminating point switching complex respectively.

DETAILED DESCRIPTION

Figure 1:
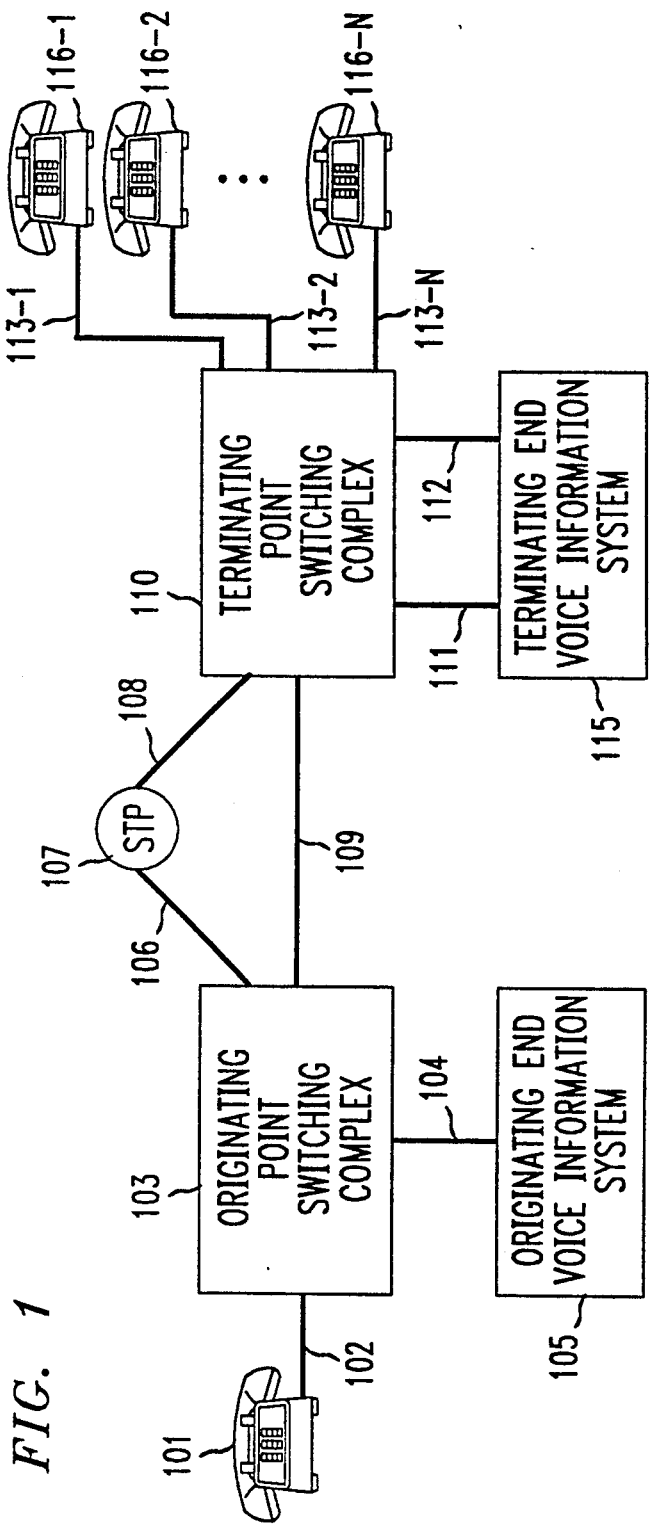
FIG. 1 shows, in block diagram form, a communication switching system arranged to complete a series of calls destined for called parties within the same target area, using the same communication path for each call in the series in accordance with our invention.

FIG. 1 shows, in block diagram form, a communication switching system arranged to complete a series of calls destined for called parties within the same target area, using the same communication path for each call in the series in accordance with our invention. In FIG. 1, station set 101 is shown linked via access/egress line 102 to Originating Point Switching Complex 103. Similarly, station sets 116-1 to 116-N are shown linked to Terminating Point Switching Complex 110 via access/egress lines 113-1 to 113-N. A detailed description of originating point switching complex 103 and terminating point switching complex 110 is provided below.

Originating point switching complex 103 and terminating point switching complex 110 exchange call handling messages via a data network called a Common Channel Signaling (CCS) network to which those switching complexes are linked via data lines 106 and 108, respectively. The CCS network is a packet switching network composed of a plurality of interconnected nodes called Signal Transfer Points (STPs) that are used to exchange call handling messages between switches according to a specific protocol, such as CCS7. However, for the sake of simplicity, the signaling network is represented in FIG. 1 by a single Signal Transfer Point, namely STP 107. The features and functionality of an STP are described in the book "*Engineering and Operations in the Bell System,*" Second Edition, pp. 292-294, AT&T Bell Laboratories Inc., 1982. Further information on the CCS network can be found in U.S. Pat. No. 3,624,613 issued to W. B. Smith et al., on Nov. 30, 1971.

FIG. 1 also shows originating point switching complex 103 and terminating point switching complex connected to originating end voice information system 105 and terminating end voice information system 115, respectively. A voice information system, whether originating or terminating, is a processor-controlled, software-driven switching system with storage devices and which has a trunk interface unit connected to an incoming trunk such as trunk 111 or a bidirectional trunk such as trunk 104. A voice information system is sometimes called by its functional name of "attached prompting mechanism" or by the more genetic name of "adjunct processor". Through its automatic call director facility, voice information system 105 (115) can transfer calls from one line, such as an incoming line, to another line, such as an outgoing line as part of a logical channel in an outgoing trunk. The user interface of voice information system 105 (115) is handled by a call processing unit which executes a set of primitives to answer incoming calls and to greet callers with pre-recorded voice prompts to direct callers to enter specific information to process their calls. The operation of voice information system 105 (115) is controlled by system software comprised of transaction scripts which include commands i) to answer incoming calls, ii) to prompt callers to enter touch-tone or spoken information, and iii) to gather such information and transfer calls. In addition, the system software allows voice information system 105 (115) to verify the identity of callers using primitives incorporating speaker verification technology or well-known table look-up techniques.

By implementing a significant number of its features through the execution of transaction scripts, voice information system 105 (115) is able to offer specific capabilities to a caller based on the signal received from the called party's station set. For example, by listening to terminating supervisory signals or call progress tones (busy, ring-no-answer or special information tones that ordinarily precede answering machine announcements) voice information system 105 (115) can take specific actions based on the type of signal received. Those actions include bridging, transferring, terminating calls or prompting a caller for additional information. A voice information system may be implemented using the AT&T Conversant ® Voice System whose architecture and features are described in *AT&T Technical Journal* Vol. 65, Issue 5, pp. 34–47, Sep./Oct. 1986.

The different alternatives for originating point switching complex 103 are presented in FIG. 2. In that figure, LEC switch 201 represents the Local Exchange Carrier (LEC) telephone network comprised of Central Office equipment such as a switch and transmission facilities. A central office switch may be, by way of example, an electronic program-controlled telecommunication switching system, such as the AT&T No. 1ESS TM (Electronic Switching System) or the AT&T 5ESS ® switch. The No. 1ESS is described in the *Bell System Technical Journal (BSTJ)*, Sept., 1964, Volume XLIII, Number 5, Parts 1 and 2, and in U.S. Pat. No. 3,570,008 issued to R. W. Downing, et al., in Mar. 9, 1971. A detailed description of the structure of the AT&T 5ESS switch is provided in *AT&T Technical Journal*, Vol. 64, No. 6, part 2, pp. 1305–1564, July/August, 1985.

In FIG. 2, one can see that 201, 202, 203 and 204 represent different alternatives for originating point switching complex 103 of FIG. 1. Conversely, in FIG. 3, 301, 302, 303 and 304 represent alternatives for terminating point switching complex 110 of FIG. 1. In alternative 201, terminating point switching complex 103 of FIG. 1 is represented by a LEC switch. Alternative 202, by contrast, shows LEC switch 202-1 and Interexchange Carrier toll switch 202-2. The latter is a processor-controlled, software-driven long distance telephone switching system that operates as point of access and egress for LEC central office or premises-based switching system traffic. Toll Switch 202-2 may be implemented using the AT&T No. 4ESS TM switch whose features and functionality are explained extensively in *Bell System Technical Journal* (BSTJ), Vol. 56, No. 7, pp. 1015–1320, September 1977.

Alternatives 203 and 204 depict a Private Branch Exchange (PBX) connected to a LEC switch (alternative 203) or a toll switch (alternative 204). In the latter alternative, PBX 204-1 is shown connected to toll switch 204-3 via Integrated Services Digital Network (ISDN) Primary Rate Interface (PRI) transmission line 204-2. PBX 204-1 or 203-1 is a premises telecommunication switching system which interconnects station sets at the premises and allows them to communicate between themselves and with other non-premises telephone sets via its connection to the public switched telephone network. The central nerve of a digital PBX, such as the AT&T Definity ® digital PBX, is a communication processor, which typically has storage devices that may contain, for example, a database of telephone numbers of a group of telephone subscribers. Ordinarily, a digital PBX offers enhanced features such as voice mail, automatic call distribution, call vectoring, etc. Of particular importance to our invention is the conditional call vectoring feature which allows the PBX to provide specific treatment for calls based on certain conditions. For example, if a PBX retrieves from its storage device a called party number and dials that number to encounter a busy signal, the PBX can terminate the call. Similarly, if the PBX encounters a recorded announcement from the called party, the PBX can abandon the call or use its voice mail capabilities to leave a message for the called pray. Conversely, if the called party answers, the digital PBX can use its ACD feature to distribute the call to one of its idle stations to handle the call.

Another important feature of most digital PBXs, such as the AT&T Definity PBX, is a high-speed digital multiplexed interface connecting the PBX to a communication carrier switching complex. The digital multiplexed interface may conform to ISDN PRI standards adopted by international standard bodies, such as the International Consultative Committee for Telephone and Telegraph, better known by its French acronym "CCITT". Transmission line 204-2 conforms to the ISDN PRI standard. One of the key attributes of the ISDN PRI standard is the support for twenty-four 64 Kbps channels over a standard DS-1 facility. Of particular importance is the portion of the standard requiring the use of twenty-three of those channels to carry voice or data information and one common channel to exclusively carry signaling information for the other twenty-three channels. The signaling channel can be used, for instance, to carry user information (ANI, called party name) and terminating supervisory signals, allowing additional flexibility in call setup and termination procedures. Additional information regarding ISDN standards in general, and PRI interface in particular, can be found in *AT&T Technical Journal*, Vol. 65, No. 6, Issue 1, pp. 1–55 January/February 1986. The information provided above regarding all the components on FIGS. 1 and 2 is readily applicable to the components of FIGS. 3 and 4. Unlike FIG. 2, in which alternatives 201 to 204 are set up for outgoing calls, alternatives 301 to 304 of FIG. 3, by contrast are arranged to process incoming calls.

Figure 4:
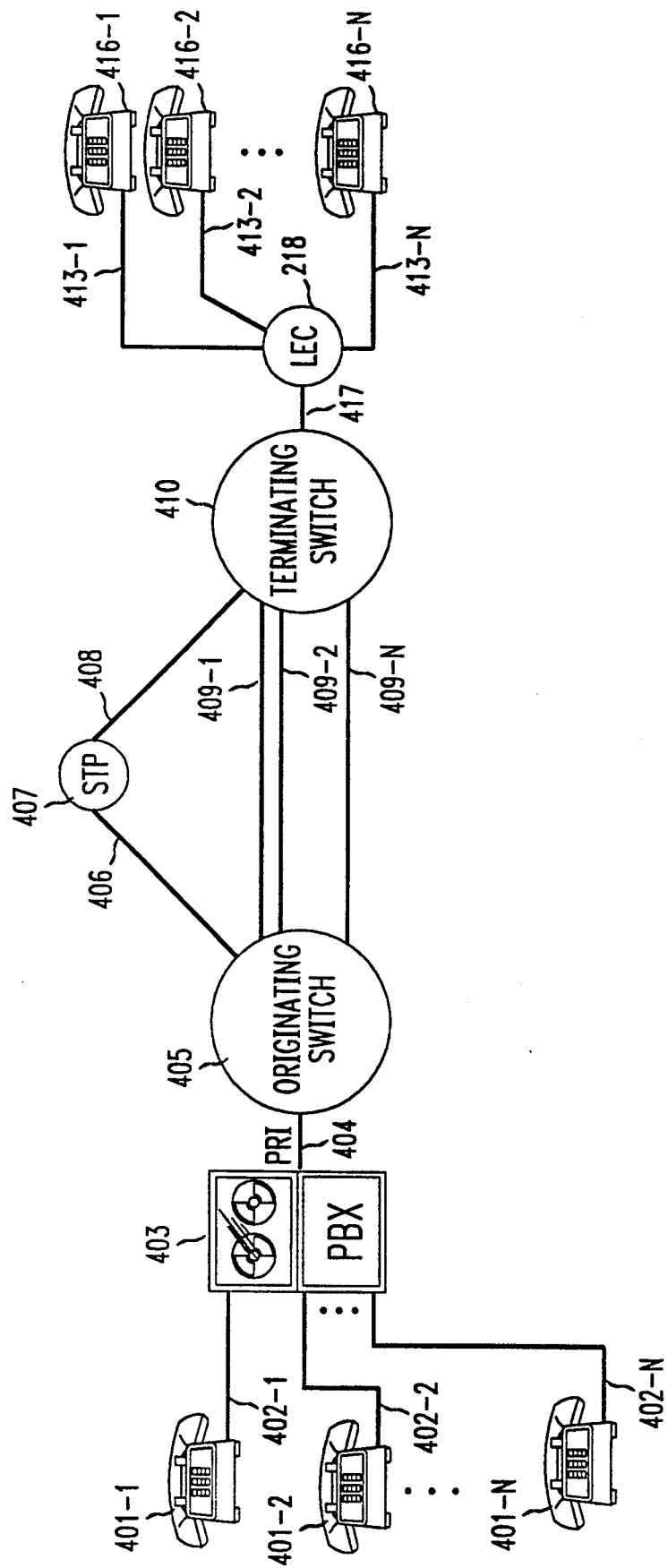
FIG. 4 displays in block diagram form a communication switching system designed to allow reserved communication channels to be repetitively used as nailed-up connections to complete a series of calls dialed by a voice premises equipment switching system.

In FIG. 4, originating switch 405 and terminating switch 410 represent toll switches whose key attributes were described earlier. Transmission lines 409-1 to 409-N depict logical communication channels that may be part of the same physical facility.

Figure 5:
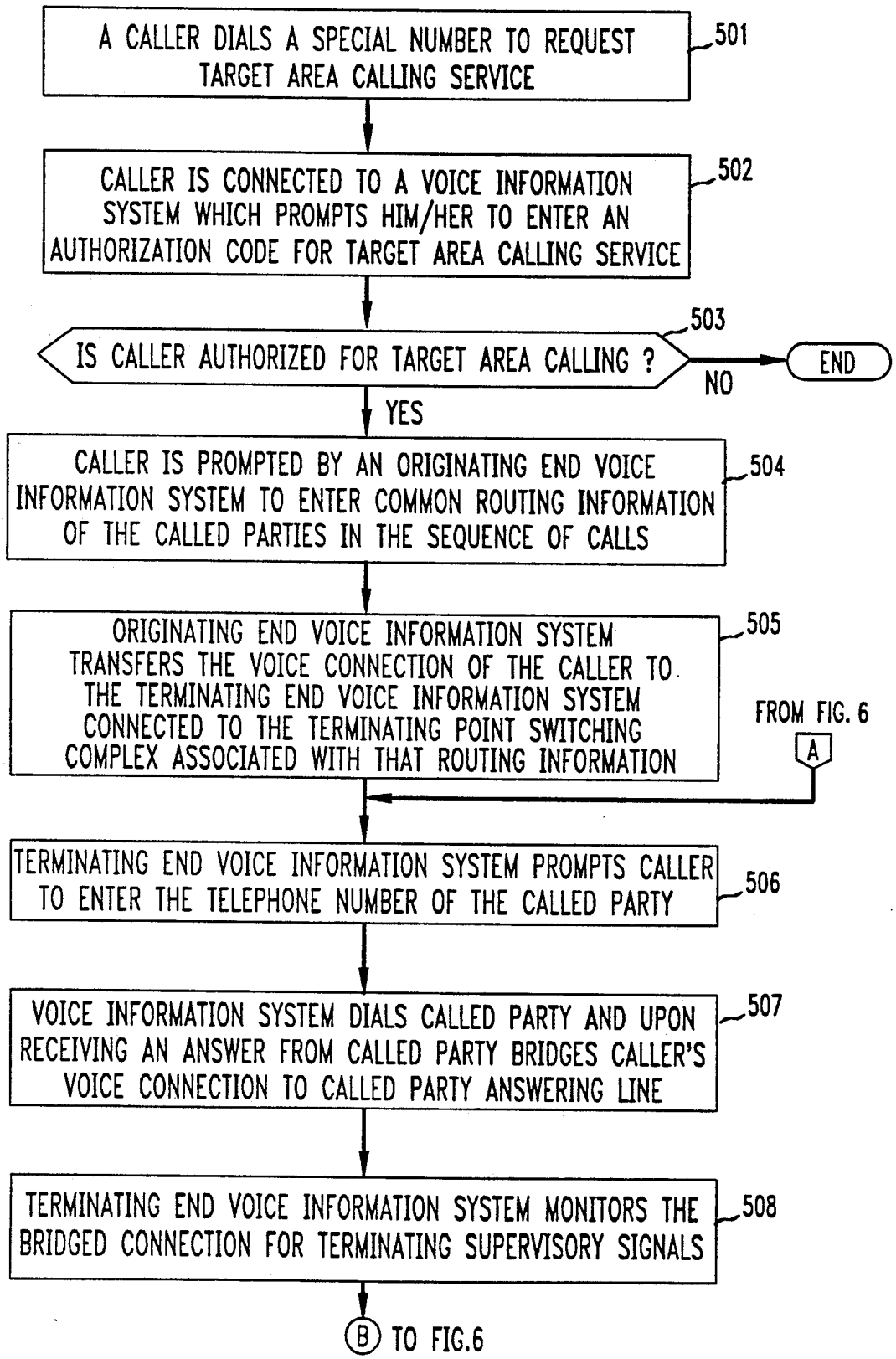
FIGS. 5, 6 and 7 present, in flow diagram format, actions taken and decisions formulated by different components of a communication switching system leading to the repetitive use of the same communication path to complete each call in a series of calls destined for called parties located in the same geographic area.
Figure 6:
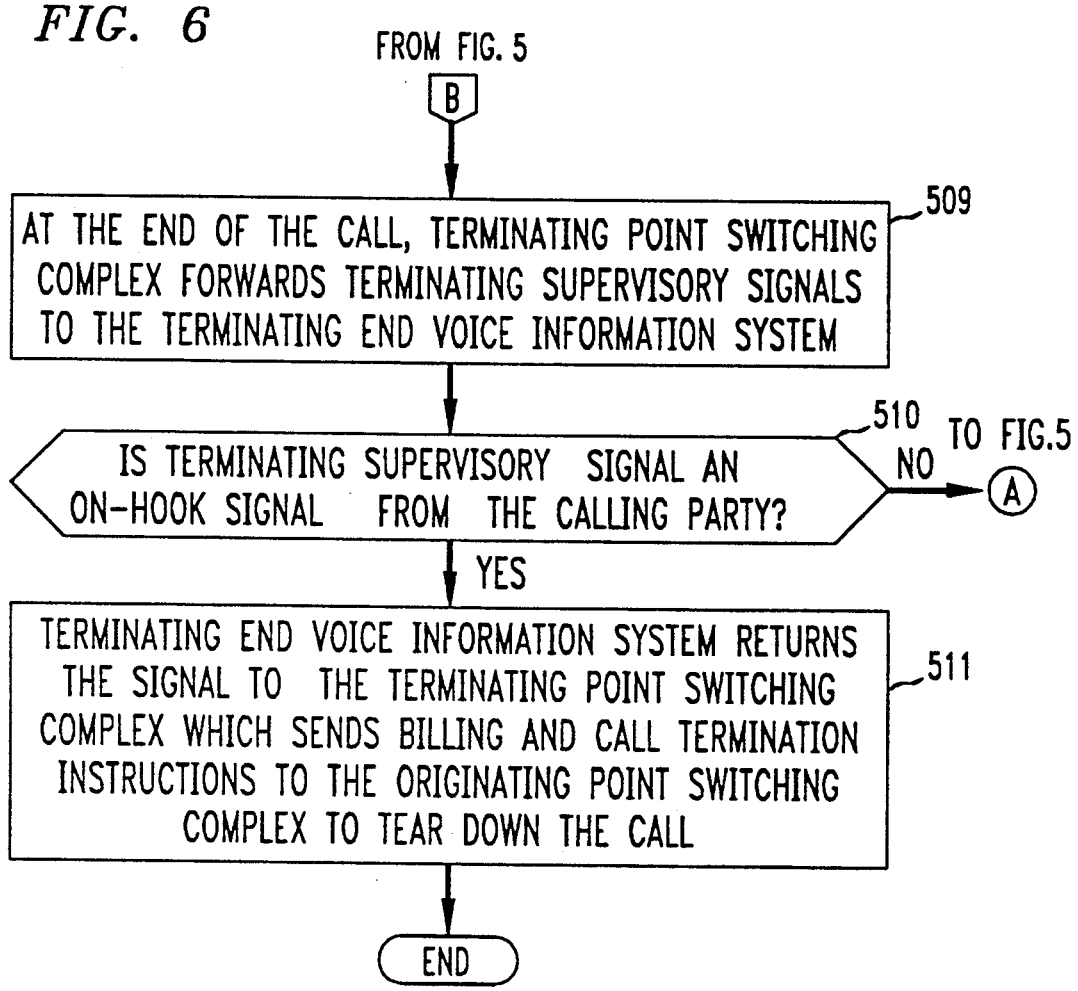
Figure 7:
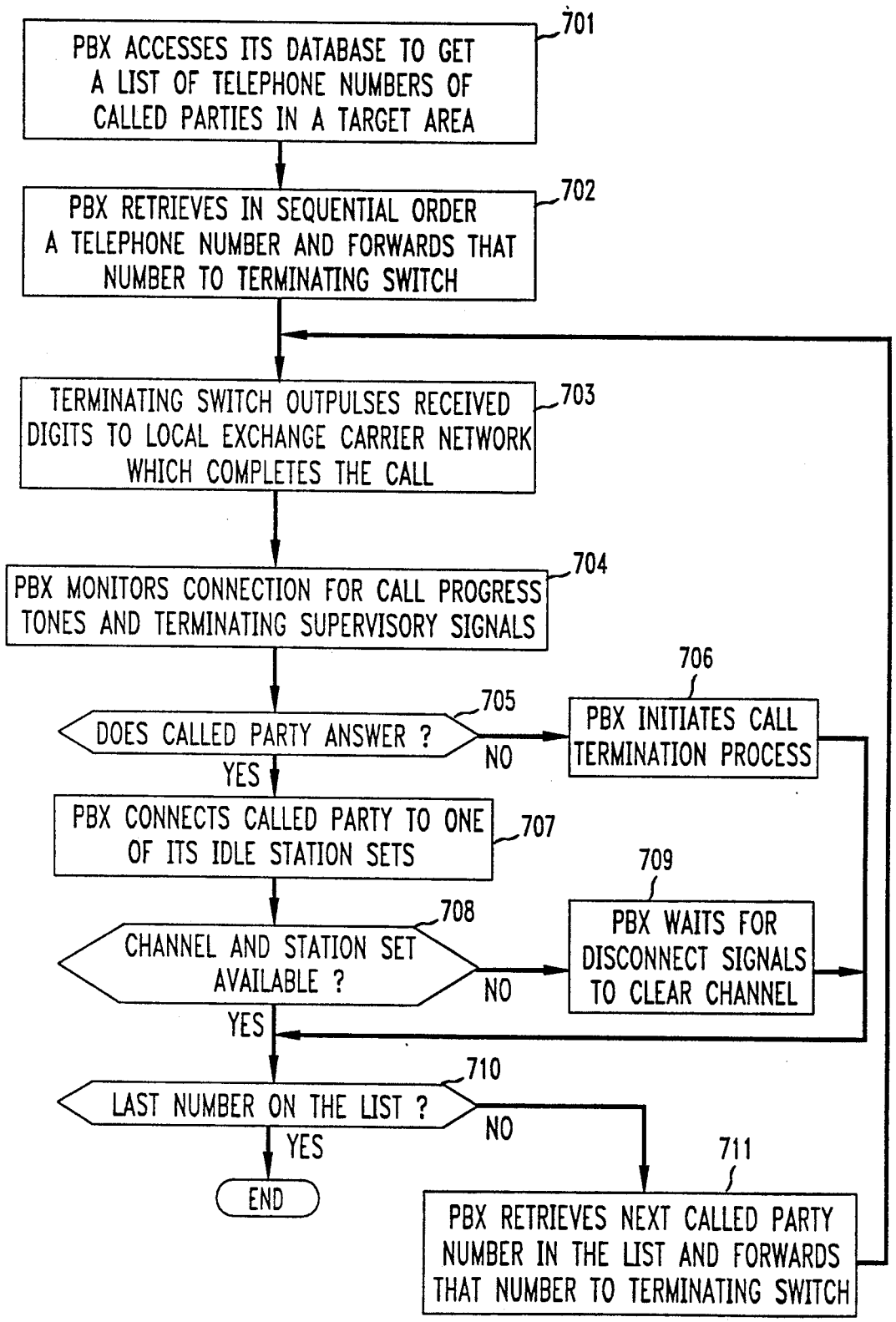

FIGS. 5, 6, and 7 show in the form of logical flow diagrams arrangements and processes under which target area calling service can be provided. Referring to FIG. 5, target area calling is initiated in step 501, by a caller dialing a special number to request target area calling service. The dialed number and the calling party number, also called Automatic Number Identification (ANI), are received by originating point switching complex 103 over line 102. Originating point switching complex 103 completes the call to originating end voice information system 105 (for alternatives 301 and 302) or terminating end voice information system 115 (for alternatives 303 and 304). Voice information system 105 or 115, in step 502, prompts the caller to enter a spoken or a Dual Tone Multiple Frequency (DTMF) authorization code. Originating (terminating) end voice information system 105 (115) checks the validity of the authorization code, in step 503, using well-known speaker recognition technology or password table lookup techniques. If the caller is not authorized, originating (terminating) end voice information system 105 (115) prompts the caller to reenter the authorization code. If the caller authorization code is still not verified, originating (terminating) end voice information system 105 (115) disconnects the caller and registers its Automatic Number Identification in its storage device. If the authorization code validation process is performed by terminating voice information system 115, steps 504 and 505 are skipped. If the caller's authorization code is verified by originating end voice information system 105, the latter, in step 504, prompts the caller to enter common routing information for the called parties, such as the area code of the called parties. After receiving the caller-entered routing information, originating end voice information system 105, in step 505, transfers the call to terminating end voice information system 114 which is connected to terminating point switching complex 110 associated with the routing information provided by the caller. From this point on, control of the call rests with terminating end voice information system 115. In step 506, terminating end voice information system 115 prompts the caller to enter the telephone number of the called party. Upon receiving that number, terminating end voice information system 115 dials the called party by forwarding the received called party telephone number to terminating point switching complex 110 via outgoing trunk 112 to complete the call. It is worth noting at this stage of the disclosure that the number entered by the caller may be a local number, since the communication switching system has to set up only the final leg of the connection to the called party. The local number may be a seven-digit number. A four-digit number can also be used as a local number if terminating point switching complex 110 is implemented in alternative 303 or 304. Upon receiving an answer from the called party, terminating end voice information system 115, in step 507, bridges the caller's initial connection to the called party's answering line. Thus, terminating end voice information 115 establishes a communication path from the caller to the called party which is comprised of a first connection from station set 101 to voice information system 115 and a second connection from terminating end voice information system 115 to the first called party. In step 508, terminating voice information system 115 monitors the connection between the caller and the calling pray for terminating supervisory signals. At the end of the call, terminating point switching complex 110, in step 509, releases the communication path used to complete the call (such as line 113-1 for a called pray at station set 116-1), and forwards the terminating supervisory signals received from either the caller or the called party to terminating end voice information system 115. The latter, in step 510, determines if the received terminating supervisory signal is an on-hook signal from station set 101. The caller may want to terminate the call when the called party is unavailable. The caller in that case may use, for example, a predetermined terminating supervisory signal, such as a '#' or a predetermined string of characters, such as '**3'. If an on-hook terminating supervisory signal is not emitted by station set 101, voice information system repeats steps 506 to 510 until an on-hook signal is received from station set 101. Then, in step 511, voice information system 115 sends a terminating supervisory signal to terminating point switching complex 110 which proceeds to send all gathered billing information and call termination instructions to originating point switching complex 103 to "tear down" the entire communication path, including the path between station set 101 and terminating end voice information system 115.

For the second embodiment of our invention, prior to initiating target area calling, communication channels 409-1 to 409-N, which connect originating switch 405 to terminating switch 410, are reserved by the calling party. The reservation of communication channels is well-known in the art, and is a service that can be provided, for example, by an IXC, such as AT&T within its Accunet ® Reserved service. Referring to FIG. 7, once the communication channels are reserved, PBX 403, in step 701, accesses a database which contains a list of telephone numbers of called parties located in the target area. PBX 403, in step 702, retrieves in sequential order from that list, the telephone number of each of the called parties, and forwards the number to originating switch 405, which sends the called party information, via STP 407 to terminating switch 410. The latter, in step 703, sends the received information to LEG network 218 to establish an initial communication path to the called party. In step 704, PBX 403 monitors the path to determine, in step 705, if the called party answers. The monitoring activity include listening for call progress tones (ring no answer, busy, or special information tones that ordinarily precede an answering machine announcement). If the called party does not answer, PBX 403, in step 706, tears down the connection by sending via STP 407 terminating supervisory signals to clear the communication path. If the called party answers, PBX 403 in step 707, distributes the call to one of its idle station sets, thereby establishing a complete communication path between one of the idle station sets served by PBX 403 and the called party. In step 708, PBX 403 determines whether any of the stations served by PBX 403 are idle and whether any of the reserved channels (409-1 to 409-n) are available. If no station set or channel is available, PBX 403 waits for a disconnect signal from one of the seized channels to clear that channel. If and when a station set and a channel are idle, PBX 403 determines, in step 710, whether any telephone numbers are left on the list. PBX 403 also performs step 710 after clearing a channel on which a ring-no answer or a busy signal was received. If any undialed number is left on the list, PBX 403, in step 411, retrieves the next called party number on the list and forwards that number to terminating switch 410. Then PBX 403 repeats steps 703 to 711, reusing communication paths 409-1 to 409-N until all the numbers on the list have been dialed. If there is no number left on the list, PBX 403 sends a message to originating switch 211 indicating that the reserved communication channels can be released.

The above description is to be construed only as an illustrative embodiment of this invention. Persons skilled in the art can easily conceive of alternative arrangements providing functionality similar to our invention without any deviation from the fundamental principles or the scope of this invention.

With this invention, volume callers, such as telemarketers, placing a long series of calls to called parties located in a geographic area served by the same terminating switch, no longer have to incur sometimes significant switching system call setup delay for each call. Conversely, communication carriers implementing this invention no longer have to set up and release an entire connection for each call in a series placed by a caller when a significant portion of the communications path for each call in the series is the same. With this invention, the number of messages sent over the signaling network to release a connection at the end of each call in a series of calls can be advantageously reduced. Similarly, the number of "switching occurrences" needed to set up the individual calls in a series of calls is advantageously reduced, thereby effectively decreasing the switching component cost associated with the series of calls.

The cumulative effect of the decreased number of switching occurrences takes added significance when one considers that the widespread deployment of cost effective fiber optics-based transmission facilities has made the switching (rather than the transmission) aspect of long-distance calls the most expensive component of such calls. Accordingly, reduction of "switching occurrences" when making a long series of calls can translate into a significant decrease in cost that can be passed to target area calling subscribers.

We claim:

1. A method of completing each call in a series of telecommunications calls originated from a calling party and destined for a plurality of called parties served by a common terminating point switching complex, comprising the steps of:
   (a) establishing an initial connection between said calling party and a first one of said called parties through a communication path extending from said calling party to said terminating point switching complex;
   (b) inhibiting release of said communication path for the duration of said series of calls; and
   (c) completing each call in said series of calls by establishing a connection between said calling party and a different one of said called parties, wherein said connection includes said communication path.

2. The method of claim 1, wherein said terminating switching complex is a communication carrier switch which includes an attached prompting mechanism, and wherein said method further includes the step of soliciting from said calling party the telephone number of each of said called parties in response to a query from said prompting mechanism.

3. A method of completing each call in a series of telecommunications calls from a calling party to a plurality of called parties, each called party served by a common terminating point switching complex, wherein said method comprises the steps of:
   (a) establishing an initial communication path between said calling party and said terminating point switching complex; and
   (b) without releasing said communication path between calls, completing each call in said series by establishing a connection which includes at least a first segment and a second segment, wherein said first segment includes said communication path, and said second segment includes a path from said terminating point switching complex to a different one of said called parties.

4. The method of claim 3, wherein said method further includes the steps of:
   prompting said calling party to provide an authorization code indicative of permission to initiate said series of calls; and
   verifying said authorization code before establishing said initial communication path.

5. In a communication switching complex which includes a terminating switching point arranged to release, at the end of each call routed through said switching point, a communication link seized to complete said call, a method of completing each call in a series of telecommunications calls from a caller to a plurality of called parties served by, and in geographic proximity of said terminating switching point, wherein said method comprises the steps of:
   (a) establishing an initial connection between said calling party and a first one of said called parties, wherein said initial connection includes a communication link between said calling party and said terminating switching point;
   (b) restraining said terminating switching point from releasing said communication link for all subsequent calls in said series; and
   (c) completing each call in said series by establishing a connection which includes said communication link and a different link between said terminating switching point and other ones of said called parties.

6. The method of claim 5, wherein said terminating switching point includes a premises voice switching equipment having a prompting mechanism, and wherein said method further includes the steps of:
   in response to a signal from said prompting mechanism, soliciting an authorization code from said calling party before establishing said initial connection,
   verifying said authorization code; and
   soliciting from said calling party the telephone number of each said called party to complete each said call.

7. A method of completing each call in a series of telecommunications calls from a calling party to a plurality of called parties served by a common terminating switching point, comprising the steps of:
   (a) establishing a first connection from said calling party to an adjunct processor attached to said terminating switching point;
   (b) prompting said calling party to enter the telephone number of one of said called parties;

(c) establishing a second connection from said adjunct processor to said called party;
(d) bridging said first and said second connections to form a communication path between said calling party and said called party;
(e) monitoring said communication path for terminating supervisory signals;
(f) receiving said terminating supervisory signals in said adjunct processor at the end of each said call;
(g) upon reception of said signals, releasing said second connection while maintaining said first connection for subsequent calls in said series; and
(h) repeating steps (b), (c), (d), (e), (f) and (g) for each subsequent call in said series.

8. The method of claim 7 further including the step of releasing said first connection when said calling party terminates the last call in said series of calls.

9. A system of completing each call in a series of telecommunications calls originated from a calling party and destined for a plurality of called parties served by a common terminating point switching complex, comprising:
(a) means for establishing an initial connection between said calling party and a first one of said called parties through a communication path extending from said calling party to said terminating point switching complex;
(b) means for inhibiting release of said communication path for the duration of said series of calls; and
(c) means for completing each call in said series of calls by establishing a connection between said calling party and a different one of said called parties, wherein said connection includes said communication path.

10. The system of claim 9, wherein said terminating switching complex is a communication carrier switch which includes an attached prompting mechanism, and wherein said system further includes means for soliciting from said calling party the telephone number of each of said called parties in response to a query from said prompting mechanism.

11. A system of completing each call in a series of telecommunications calls from a calling party to a plurality of called parties, each called party served by a common terminating point switching complex, wherein said system comprises:
(a) means for establishing an initial communication path between said calling party and said terminating point switching complex; and
(b) without releasing said communication path between calls, means for completing each call in said series by establishing a connection which includes at least a first and a second segment, wherein said first segment includes said communication path, and said second segment includes a path from said terminating point switching complex to a different one of said called parties.

12. The system of claim 11, wherein said system further includes:
means for prompting said calling party to provide an authorization code indicative of permission to initiate said series of calls; and
means for verifying said authorization code before establishing said initial communication path.

13. In a communication switching complex which includes a terminating switching point arranged to release, at the end of each call routed through said switching point, a communication link seized to complete said call, a system of completing each call in a series of telecommunications calls from a caller to a plurality of called parties served by, and in geographic proximity of said terminating switching point, wherein said system comprises:
(a) means for establishing an initial connection between said calling party and a first one of said called parties, wherein said initial connection includes a communication link between said calling party and said terminating switching point;
(b) means for restraining said terminating switching point from releasing said communication link for all subsequent calls in said series; and
(c) means for completing each call in said series by establishing a connection which includes said communication link and a different link between said terminating switching point and other ones of said called parties.

14. The system of claim 13, wherein said terminating switching point includes a premises voice switching equipment having a prompting mechanism, and wherein said system further includes:
in response to a signal from said prompting mechanism, means for soliciting an authorization code from said calling party before establishing said initial connection;
means for verifying said authorization code; and
means for soliciting from said calling party the telephone number of each said called party to complete each said call.

15. A system of completing each call in a series of telecommunications calls from a calling party to a plurality of called parties served by a common terminating switching point, comprising:
(a) means for establishing a first connection from said calling party to an adjunct processor attached to said terminating switching point;
(b) means for prompting said calling party to enter the telephone number of one of said called parties;
(c) means for establishing a second connection from said adjunct processor to said called party;
(d) means for bridging said first and said second connections to form a communication path between said calling party and said called party;
(e) means for monitoring said communication path for terminating supervisory signals;
(f) means for receiving said terminating supervisory signals in said adjunct processor at the end of each said call; and
(g) means responsive to said signals for releasing said second connection while maintaining said first connection for subsequent calls in said series.

16. The system of claim 15 further including means for releasing said first connection when said calling party terminates the last call in said series of calls.

17. A method of completing each call in a series of calls that are placed by a PBX and that are directed to a targeted geographical area comprising the steps of:
a) establishing a communications link having a plurality of channels between said PBX and a terminating switch serving subscribers in said geographical area;
b) retrieving a stored telephone number of one of said subscribers and dialing said number;
c) establishing a connection over an idle one of said channels between said PBX and one of said subscriber's telephone set;

d) in response to a signal from one of said subscribers, retrieving profile data associated with said one of said subscribers;

e) bridging the established connection to an idle station connected to said PBX; and f) repeating steps b), c), d), and e) until all channels in said link are used for connections for calls directed to said subscribers, and all stored telephone numbers associated with said target area have been dialed by said PBX.

18. A system of completing each call in a series of calls that are placed by a PBX and that are directed to a targeted geographical area comprising:

means for establishing a communications link having a plurality of channels between said PBX and a terminating switch serving subscribers in said geographical area;

means for retrieving a stored telephone number of each one of said subscribers and dialing said number;

means for establishing a connection over each idle one of said channels between said PBX and one of said subscriber's telephone set;

means for retrieving profile data associated with one of said subscribers in response to an answer signal from said one of said subscribers; and means for bridging each one of said connections when answered to an idle station connected to said PBX.

* * * * *